United States Patent
Subramanian et al.

(10) Patent No.: US 6,456,842 B1
(45) Date of Patent: Sep. 24, 2002

(54) SYSTEM AND METHOD FOR SUBSCRIBER-CONTROLLED CALL BACK ON BUSY IN A CELLULAR NETWORK

(75) Inventors: Kalpana Subramanian, Plano; Gautam Talagery, Dallas, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/394,996

(22) Filed: Sep. 13, 1999

(51) Int. Cl.[7] .................. H04M 3/42; H04M 11/10; H04Q 7/20
(52) U.S. Cl. ............ 455/414; 455/412; 455/466; 379/209.1; 379/210.1
(58) Field of Search .................. 455/414–418, 455/412, 422, 458, 459, 565; 379/209.01, 210.01

(56) References Cited

U.S. PATENT DOCUMENTS

| | | | | |
|---|---|---|---|---|
| 5,625,682 A | * | 4/1997 | Gray et al. | 379/266 |
| 5,742,674 A | * | 4/1998 | Jain et al. | 379/209 |
| 6,044,275 A | * | 3/2000 | Boltz et al. | 455/466 |
| 6,138,008 A | * | 10/2000 | Dunn et al. | 455/414 |
| 6,169,795 B1 | * | 1/2001 | Dunn et al. | 379/209 |
| 6,212,268 B1 | * | 4/2001 | Nielsen | 379/209 |
| 6,301,466 B1 | * | 10/2001 | Alperovich et al. | 455/12.1 |

* cited by examiner

Primary Examiner—Vivian Chin
Assistant Examiner—Meless Zewdu
(74) Attorney, Agent, or Firm—Jenkens & Gilchrist, P.C.

(57) ABSTRACT

A telecommunications system and method is disclosed for allowing a calling mobile subscriber to activate a call back on busy feature and specify the maximum waiting period after which the call back is no longer attempted. Upon reception of a busy indication at an original Mobile Switching Center/Visitor Location Register (MSC/VLR) serving the calling mobile subscriber, the original MSC/VLR plays an announcement to the calling subscriber to collect the time interval beyond which the network should cease to attempt the call back. Thereafter, the original MSC/VLR sends a message containing the time interval to the end office or destination MSC/VLR associated with the previously busy called subscriber. In response, the end office or destination MSC/VLR Initializes a timer with the time interval, and, if the previously busy called subscriber becomes idle before the expiration of the timer, recalls the calling mobile subscriber.

26 Claims, 7 Drawing Sheets

SYSTEM AND METHOD FOR SUBSCRIBER-CONTROLLED CALL BACK ON BUSY IN A CELLULAR NETWORK

BACKGROUND OF THE PRESENT INVENTION

1. Field of the Invention

The present invention relates generally to cellular telecommunications systems and methods, and specifically to providing a call back on busy feature to mobile subscribers.

2. Background of the Present Invention

Cellular telecommunications is one of the fastest growing and most demanding telecommunications applications today. There are an increasing number of supplementary services being offered by cellular network operators to further the desirability of cellular communications. For example, one such supplementary feature is the call back on busy feature, which enables a calling mobile subscriber, encountering a busy signal at the called subscriber, to have the call completed when the called subscriber becomes idle, without having to make a new call attempt.

The European Telecommunications Standards Institute (ETSI) has set forth certain standards for Implementing the call back on busy feature within cellular networks in the GSM 02.93 version 6.0.1 Technical Specification, which was released in 1997. In this Technical Specification, when a calling mobile subscriber encounters a busy indication at the called subscriber, the calling mobile subscriber can activate the call back on busy feature against the called subscriber.

Upon activation, the network retains the call information and informs the calling mobile subscriber that the call back on busy feature has been activated. When the activation of a call back on busy request is accepted, the network initializes a network-defined callback on busy duration timer. During the time period defined by the duration timer, the network constantly monitors the called subscriber for becoming idle by attempting call setups to the called subscriber.

If, before the expiration of the network retention timer, the network determines that the called subscriber has become idle, the network waits a short time in order to allow the called subscriber to make any necessary outgoing calls. If the called subscriber does not make any outgoing calls within this time period, the network automatically recalls the calling mobile subscriber and alerts the calling subscriber that the call is a recall to the called subscriber. When the calling mobile subscriber answers, the network automatically generates a call to the now idle called subscriber.

However, under the current standards, during the time that the called subscriber is busy, the network is spending unnecessary resources in retrying the call setup until the previously busy called subscriber becomes idle. In addition, the duration timer for retrying the call is set by the network, which does not allow the calling mobile subscriber to specify the maximum waiting period after which the call back is not attempted.

SUMMARY OF THE INVENTION

The present invention is directed to telecommunications systems and methods for allowing a calling mobile subscriber to activate a call back on busy feature and specify the maximum waiting period after which the call back is no longer attempted. In addition, during the call back process, the network does not spend unnecessary resources in retrying the call setup. This is achieved through changes in the processing and signaling mechanisms at the Mobile Switching Center/Visitor Location Register (MSC/VLR) nodes in the cellular network. Upon reception of a busy indication at the original MSC/VLR serving the calling mobile subscriber, the original MSC/VLR plays an announcement to the calling mobile subscriber to collect the time interval beyond which the network should cease to attempt the call back.

Upon reception of this subscriber-defined time interval, the original MSC/VLR sends a message containing calling subscriber identification information, an indication that the call back on busy feature has been activated and the subscriber-defined time interval over which the call back on busy feature is active to the destination MSC/VLR serving the previously busy called mobile subscriber. In response to receipt of this information, the destination MSC/VLR stores the received data in a database therein, initializes a timer with the subscriber-defined time interval and acknowledges reception of the information back to the original MSC/VLR. Thereafter, the original MSC/VLR releases the resources seized by the calling mobile subscriber, which allows the calling mobile subscriber to access other services while waiting for the call back to occur.

When the destination MSC/VLR determines that the previously busy called mobile subscriber has become idle, e.g., when a traffic channel for the called mobile subscriber is released, the destination MSC/VLR sends a call setup message to the original MSC/VLR, using the information stored in the database. An indication that the call setup message is a result of a call back requested by the calling mobile subscriber is also sent in the call setup message. The original MSC/VLR uses this indication to alert the calling mobile subscriber that the incoming call is a call back from the previously busy called mobile subscriber. Thereafter, a call between the calling and called mobile subscribers is established, as normal.

In an alternative embodiment, the called subscriber can be a wireline subscriber. In this embodiment, the original MSC/VLR sends the information to an end office associated with the called subscriber. When the end office determines that the called subscriber is idle, e.g., when circuits are released for the called subscriber, the end office sends the call setup message to the original MSC/VLR to establish a call connection between the calling mobile subscriber and the called wireline subscriber.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
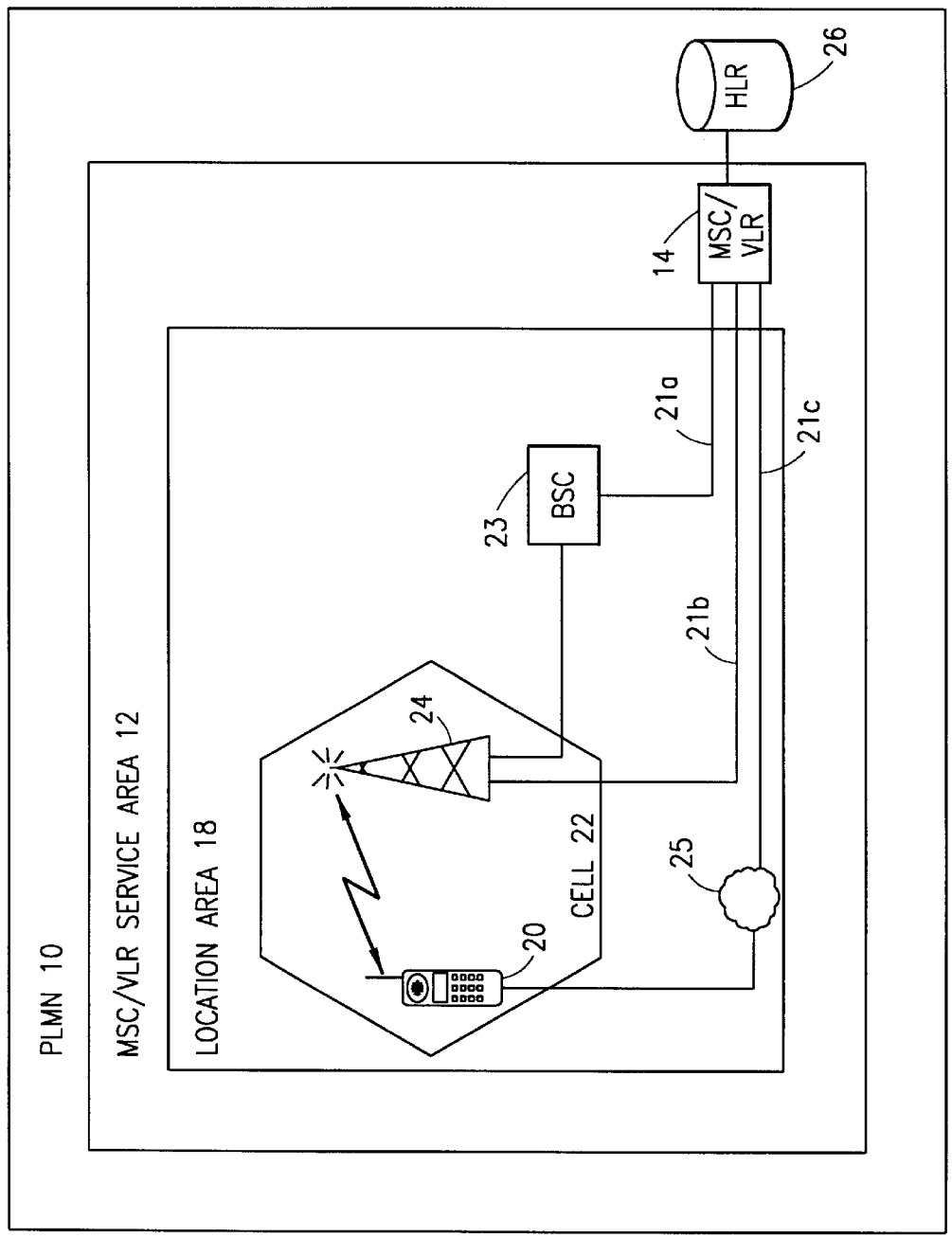
FIG. 1 is a block diagram of a conventional cellular network.

With reference now to FIG. 1 of the drawings, there is illustrated a sample cellular network 10 in the Public Land Mobile Network (PLMN), which in turn is composed of a plurality of areas 12, each with a Mobile Switching Center (MSC) and an integrated Visitor Location Register (VLR) (MSC/VLR) 14 therein. The MSC/VLR 14 provides a circuit switched connection of speech and signaling information between a Mobile Station (MS) 20 and the PLMN 10. This can be through one of a plurality of interfaces 21a, 21b or 21c, in which the interface 21c between the MS 20 and the MSC/VLR 14 signifies that communication between the MS 20 and he MSC/VLR 14 can be through any network 2D or other type of connection. The MSC/VLR areas 12, in turn, include a plurality of Location Areas (LA) 18, which are defined as that part of a given MSC/VLR area 12 in which the MS 20 may move freely without having to send update location information to the MSC/VLR 14 that controls the LA 18. Each LA 18 is further divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC/VLR 14 s in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC/VLR 14.

With further reference to FIG. 1, the PLMN Service Area or cellular network 10 also includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC/VLR 14, integrated with the MSC/VLR 14, or alternatively can service multiple MSC/VLRs 14.

Figure 2:
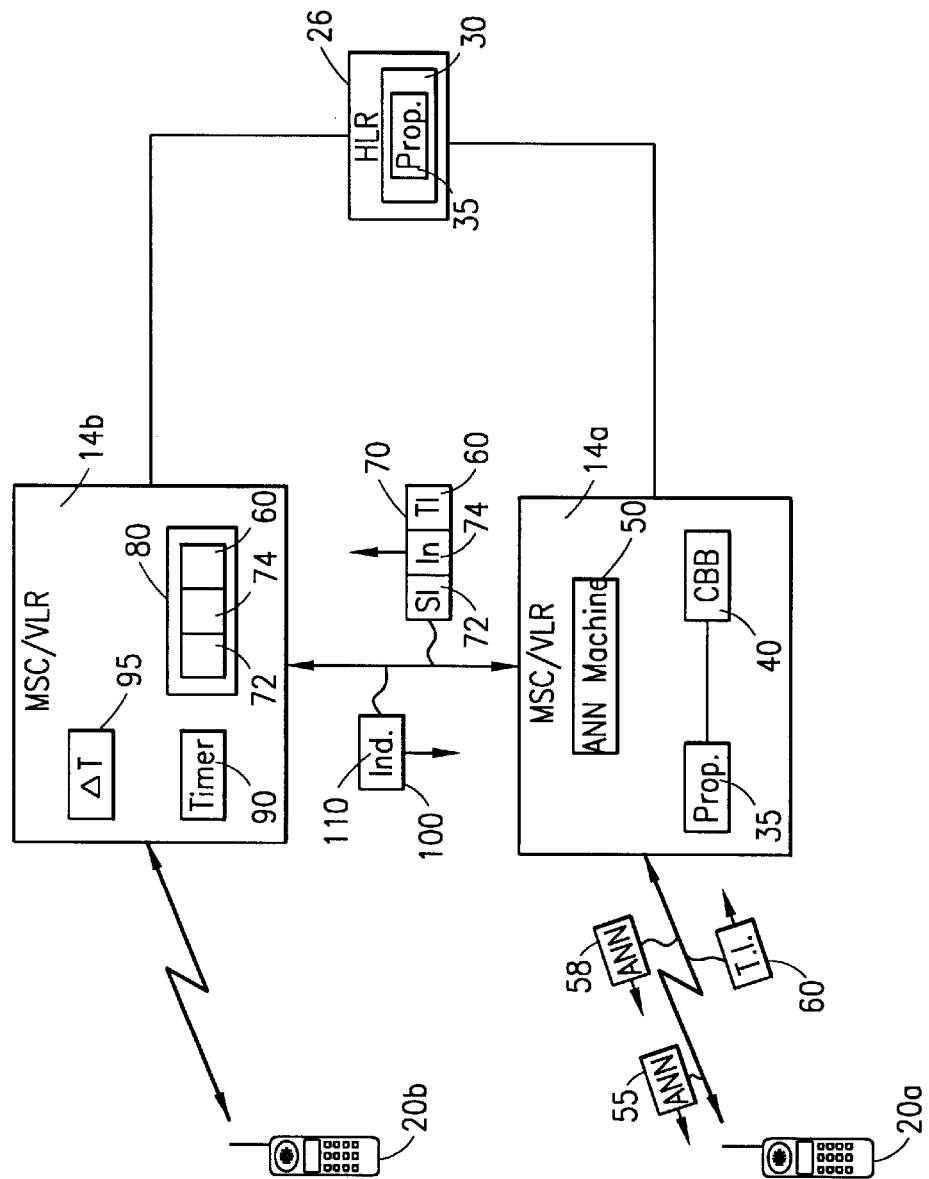
FIG. 2 is a block diagram illustrating the activation of a call back on busy feature for a called mobile subscriber in accordance with preferred embodiments of the present invention.

With reference now to FIG. 2 of the drawings, in accordance with preferred embodiments of the present invention, a calling MS 20a has the ability not only to activate a call back on busy feature 40, but also to specify a time interval 60 after which the call back is no longer attempted. To activate the call back on busy feature 40, the calling MS 20a must have a subscriber property 35 associated with it that identifies the calling MS 20a as being capable of requesting activation of the call back on busy feature 40. For example, when the calling MS 20a first enters the area associated with the serving original MSC/VLR 14a, this property 35 can be downloaded to the MSC/VLR 14a from a subscriber record 30 within the HLR 26 associated with the calling MS 20a.

Figure 3A:
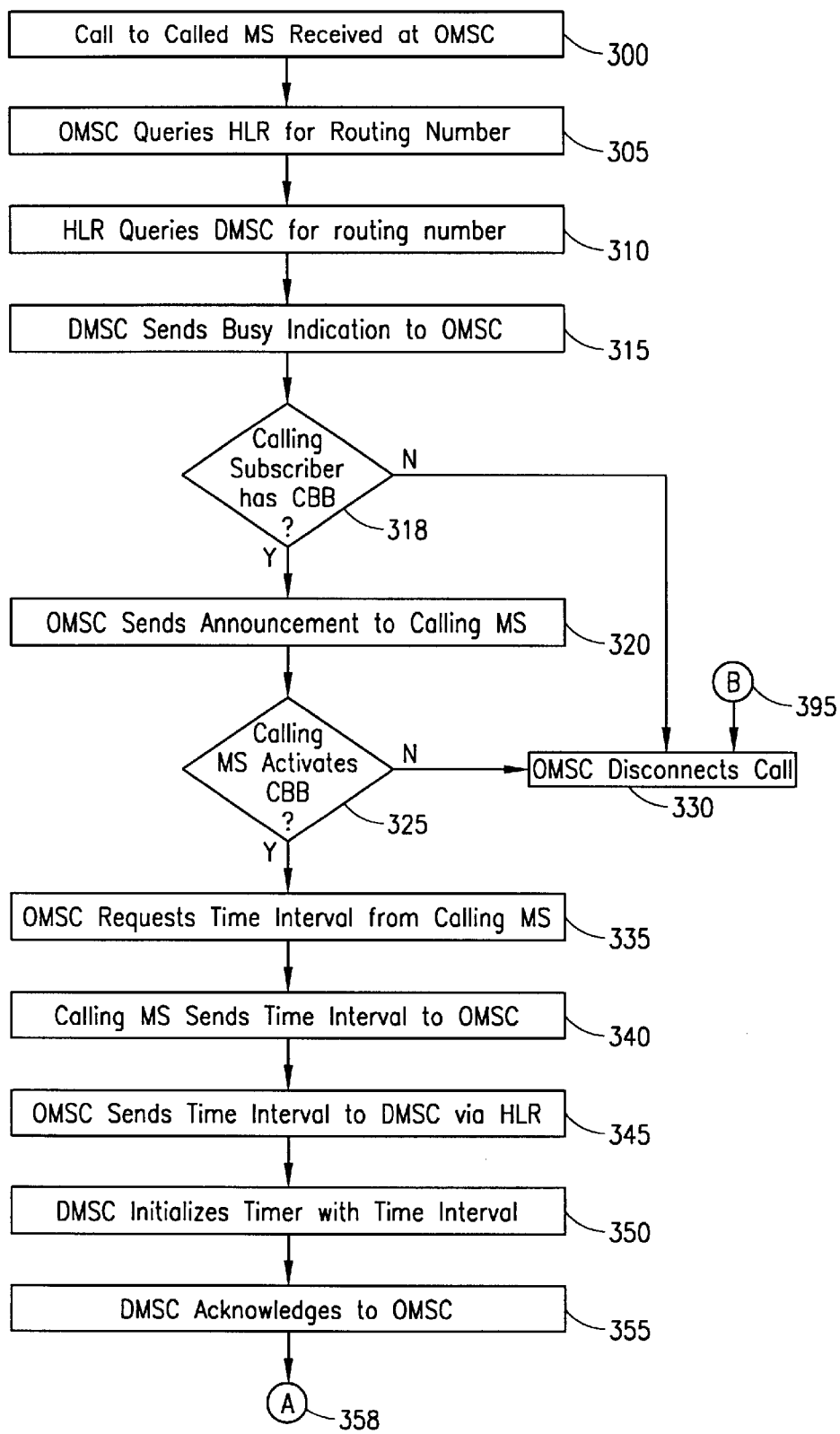
FIGS. 3A and 3B are flow charts illustrating the steps for activating the call back on busy feature shown in FIG. 2 of the drawings.

With reference now to the steps listed in FIG. 3A of the drawings, which will be described in connection with FIG. 2 of the drawings, when the calling MS 20a initiates a call to a called MS 20b (step 300), the original MSC/VLR 14a queries the HLR 26 associated with the called MS 20b for a temporary routing number to connect the call to the called MS 20b (step 305). Thereafter, the HLR 26 queries the destination MSC/VLR 14b serving the called MS 20 for the routing number (step 310). The destination MSC/VLR 14b determines if the called MS 20b is busy and, if so, returns a busy indication back to the original MSC/VLR 14a (step 315) It should be noted that the HLR 26 that stores the subscriber record (not shown) for the called MS 20b can be different than the HLR 26 that stores the subscriber record 30 for the calling MS 20a.

Upon reception of the busy indication, if the calling MS 20a has the subscriber call back on busy property 35 associated with it (step 318), the original MSC/VLR 14a accesses an announcement machine 50 and sends an announcement 55 to the calling MS 20a that inquires whether the calling MS 20a would like to activate the call back on busy feature 40 (step 320). Otherwise, the original MSC/VLR 14a disconnects the call (step 330).

In response to receiving the announcement 55 (step 320), if the calling MS 20a indicates that the call back on busy feature 40 is not needed (step 325), e.g., by the depression of one or more keys on the calling MS 20a, which causes the calling MS 20a to send a decline message (not shown) to the original MSC/VLR 14a, the original MSC/VLR 14a disconnects the call (step 330). If the calling MS 20a indicates that the call back on busy feature 40 should be activated (step 325), e.g., by sending an accept message (not shown) to the original MSC/VLR 14a, the original MSC/VLR 14a sends another announcement 58 requesting a time interval 60 from the calling MS 20a that the call back on busy feature 40 should be active (step 335).

Once the calling MS 20 sends a response message including the time interval 60 (step 340), the original MSC/VLR 14a sends a message 70 to the destination MSC/VLR 14b, which includes calling subscriber identification information 72, e.g., the IMSI number for the calling MS 20a, an indication 74 that the call back on busy feature 40 has been activated and the time interval 60 over which the call back on busy feature 40 should remain active (step 345). The destination MSC/VLR 14b stores the received information 72, 74 and 60 in a database 80 therein. It should be noted that the message 70 may also be transited through the HLR 26, as is indicated in FIG. 3A.

Thereafter, the destination MSC/VLR 14b initializes a duration timer 90 with the received time interval 60 and acknowledges reception of the information back to the original MSC/VLR 14a (step 355). When the original MSC/VLR 14a receives the acknowledgment message, the original MSC/VLR 14a releases the resources seized by the calling MS 20a, which allows the calling MS 20a to access other services even while waiting for the call back to occur. If the calling MS 20a warts to later abort the call back on busy feature 40 invocation, the calling MS 20a can initiate a transaction with the original MSC/VLR 14a, which results in the original MSC/VLR 14a marking that call back on busy feature 40 is not needed anymore.

Thus, in this case, if the called MS 20b does become free later, the original MSC/VLR 14a will not setup a call back to the calling MS 20a.

Figure 3B:
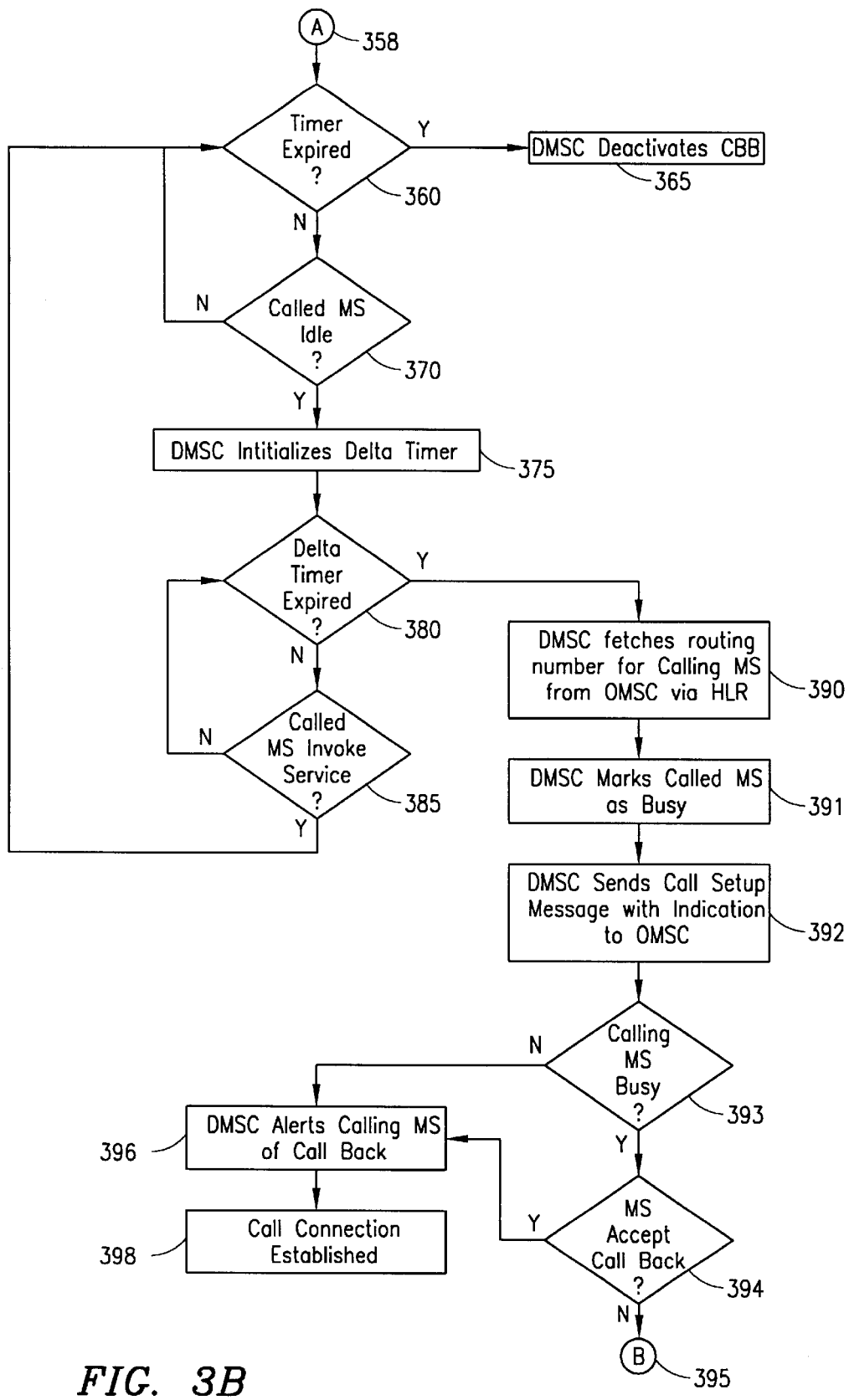

With reference now to FIG. 3B (step 358), if the called MS 20*b* does not become idle before the expiration of the duration timer 90 (step 360), the destination MSC/VLR 14*b* deactivates the call back on busy feature 40 (step 365). However, if during the duration timer 90 period (step 360), the called MS 20*b* does become idle (step 370), e.g., the destination MSC/VLR 14*b* releases a traffic channel previously assigned to the called MS 20*b*, the destination MSC/VLR 14*b* initiates a delta timer 95 stored within the destination MSC/VLR 14*b* (step 375), which requires the destination MSC/VLR 14*b* to wait for a predetermined period of time to allow the called MS 20*b* to access any necessary services, such as initiating an emergency call, etc.

If the called MS 20*b* invokes any service before the expiration of the delta timer 95 (steps 380 and 385), the called MS 20*b* is marked as busy and the destination MSC/VLR 14*b* defers the call back until the called MS 20*b* once again becomes idle during the duration timer 90 period (step 360 and 365). It should be noted that the duration timer 90 is not interrupted during the delta timer 95 period, so that if the called MS 20*b* does invoke a service during the delta timer 95 period, and the duration timer 90 has expired at the invocation of the service, the destination MSC/VLR 14*b* will deactivate the call back on busy feature 40 (step 365).

If the called MS 20*b* does not invoke any services before the expiration of the delta timer 95 (step 380), the destination MSC/VLR 14*b* queries the HLR 26 associated with the previous calling MS 20*a* for a routing number for the calling MS 20*a*, using the calling subscriber information 72 stored in the database 80 (step 390). At the same time, the destination MSC/VLR 14*b* marks the called MS 20*b* as busy (step 391). Upon receipt of the routing information, the destination MSC/VLR 14*b* initiates a call setup message 100 to the now serving MSC/VLR 14*a* of the previous calling MS 20*a*, which in this case is still the original MSC/VLR 14*a* (step 392). Included within the call setup message 100 is also an indication 110 that the call setup message 100 is the result of a call back requested by the calling MS 20*a*. As discussed above, if the original MSC/VLR 14*a* has stored an indication of cancellation of the call back on busy feature 40, the call back is canceled.

If the calling MS 20*a* is now busy (step 393), based on the indication 110 included in the call setup message 100, the original MSC/VLR 14*a* can choose to disconnect the call or allow the calling MS 20*a* to choose whether to release any existing calls and accept the call back call (step 394). For example, the original MSC/VLR can alert the calling MS 20*a* that the call back has arrived using a specific alerting tone. The calling MS 20*a* can either release the ongoing call or place the ongoing call on hold to accept the call back or ignore the call back, which results in the original MSC/VLR disconnecting the call back call (steps 395 and 330).

If the previous calling MS 20*a* is not busy (step 393) or chooses to accept the call back call (step 394), the original MSC/VLR 14*a* marks that the call back is in progress and uses the indication 110 sent in the call setup message 100 to alert the calling MS 20*a* in a special manner so that the calling MS 20*a* is aware that the incoming call is due to the previously requested call back (step 396). For example, the original MSC/VLR 14*a* can use a specific alert, e.g., a tone, different from the one used for a normal call, for the indication of a recall. Alternatively, the original MSC/VLR 14*a* can send the indication 110 that the call is a recall or send the indication 110 as part of caller ID information, if the calling MS 20*a* has subscribed to the caller ID feature.

When the calling MS 20*a* answers the call back, the original MSC/VLR 14*a* informs the destination MSC/VLR 14*b* that the connection to the previous calling MS 20*a* has been established. Thereafter, the destination MSC/VLR 14*b* pages the called MS 20*b* and establishes a call connection between the calling MS 20*a* and the called MS 20*b* (step 398).

Figure 4:
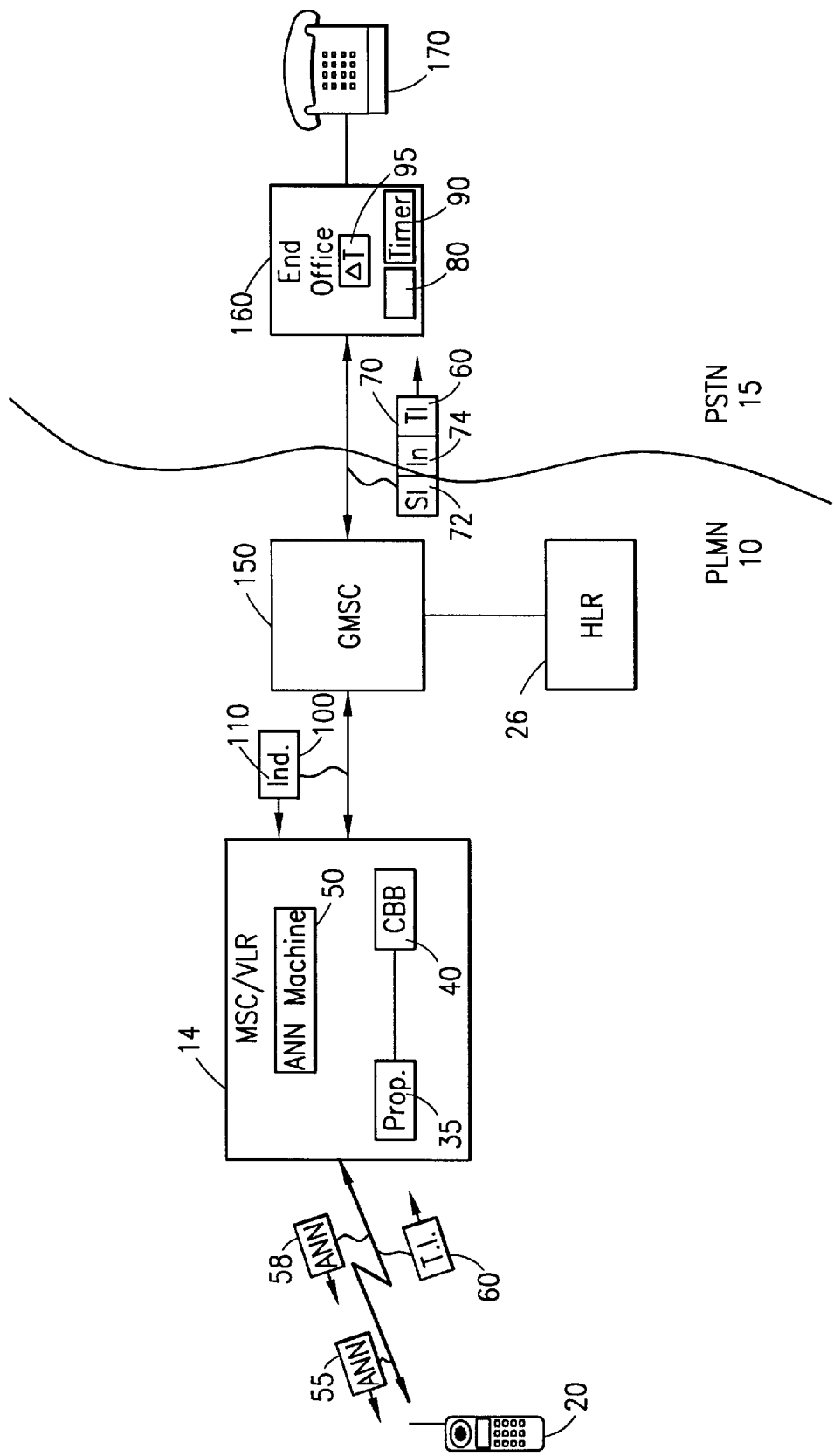
FIG. 4 is a block diagram illustrating the activation of a call back on busy feature for a called wireline subscriber in accordance with alternative embodiments of the present invention.
Figure 5A:
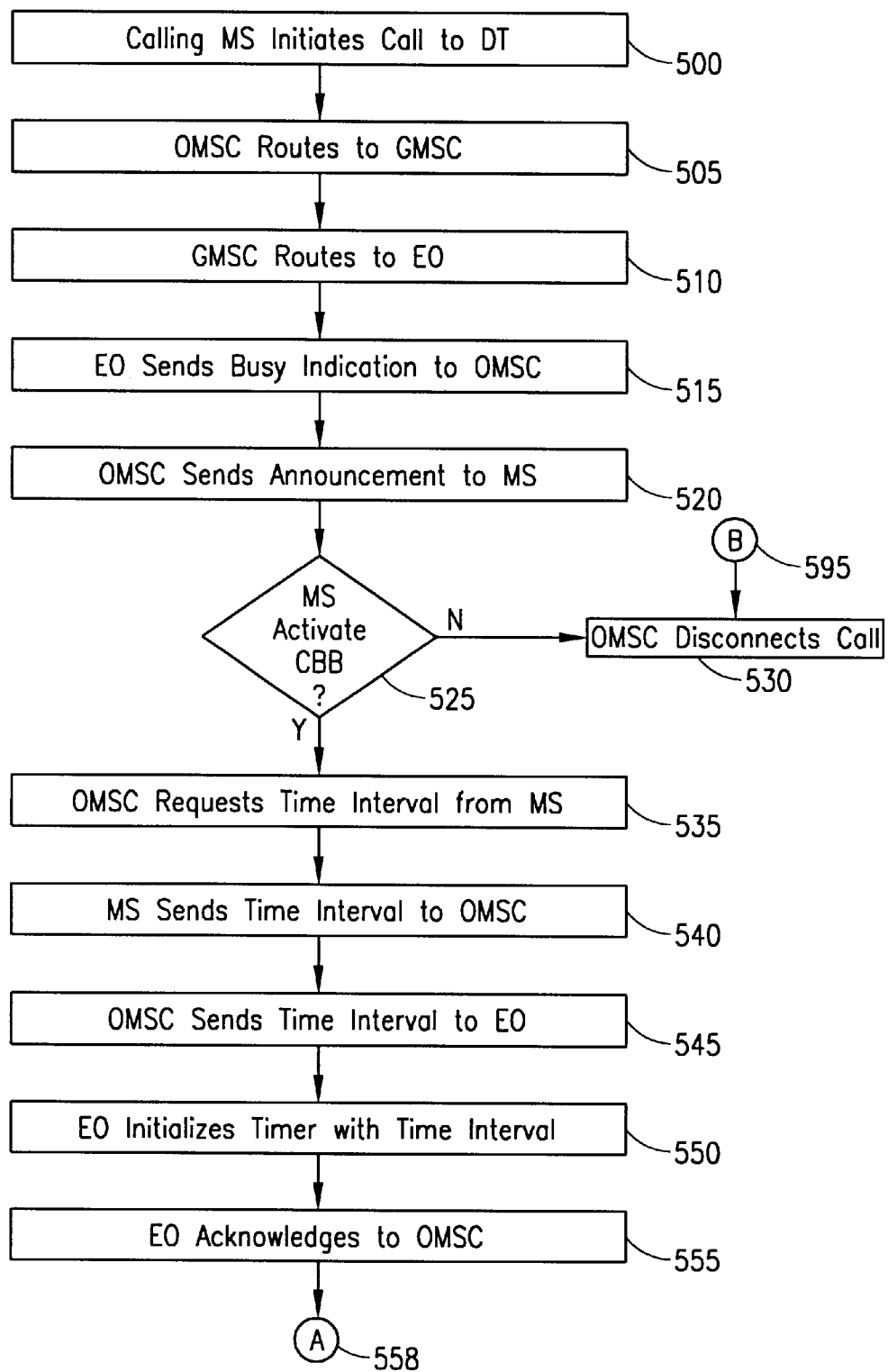
FIGS. 5A and 5B are flow diagrams illustrating the steps for activating the call back on busy feature shown in FIG. 4 of the drawings.

With reference now to FIG. 4 of the drawings, which will be described in connection with the steps listed in FIGS. 5A and 5B of the drawings, in an alternative embodiment, the called subscriber could be a wireline subscriber. In this case, when the calling MS 20 initiates a call to a destination terminal within the Public Switched Telephone Network (PSTN) 15 (step 500), the MSC/VLR 14 serving the calling MS 20 routes the call to a Gateway Mobile Switching Center (GMSC) 150 within the PLMN 10 (step 505). The GMSC 150 determines that the call is to the PSTN 15 and routes the call to an end office 160 connected to the destination terminal 170 (step 510).

If the destination terminal 170 is busy, e.g., involved in another call, the end office 160 returns a busy indication to the MSC/VLR 14 via the GMSC 150 (step 515). Upon reception of the busy indication, if the calling MS 20 has the subscriber call back on busy property 35 associated with it, the MSC/VLR 14 accesses the announcement machine 50 and plays the announcement 55 to the calling MS 20 that inquires whether the calling MS 20 would like to activate the call back on busy feature 40 (step 520).

If the calling MS 20 indicates that the call back on busy feature 40 is not needed (step 525), the MSC/VLR 14 disconnects the call (step 530). Otherwise, the MSC/VLR 14 plays another announcement 58 requesting a time interval 60 from the calling MS 20 that the call back on busy feature 40 should be active (step 535). Once the MSC/VLR 14 receives the timer interval 60 from the calling MS 20 (step 540), the MSC/VLR 14 sends a message 70 to the end office 160, which includes calling subscriber identification information 72, e.g., the IMSI number for the calling MS 20, an indication 74 that the call back on busy feature 40 has been activated and the time interval 60 over which the call back on busy feature 40 should be active (step 545). The end office 160 stores the received information 72, 74 and 60 in a database 80 therein. Thereafter, the end office 160 initializes the duration timer 90 with the received time interval 60, and acknowledges reception of the information back to the MSC/VLR 14 (step 555). As stated above, when the MSC/VLR 14 receives the acknowledgment message, the MSC/VLR 14 releases the resources seized by the calling MS 20, which allows the calling MS 20 to access other services while waiting for the call back to occur. f the calling MS 20 wants to later abort the call back on busy feature 40 invocation, the calling MS 20 can initiate a transaction with the original MSC/VLR 14, which results in the original MSC/VLR 14 marking that call back on busy feature 40 is not needed anymore. Thus, in this case, if the called terminal 170 does become free later, the original MSC/VLR 14 will not setup a call back to the calling MS 20.

Figure 5B:
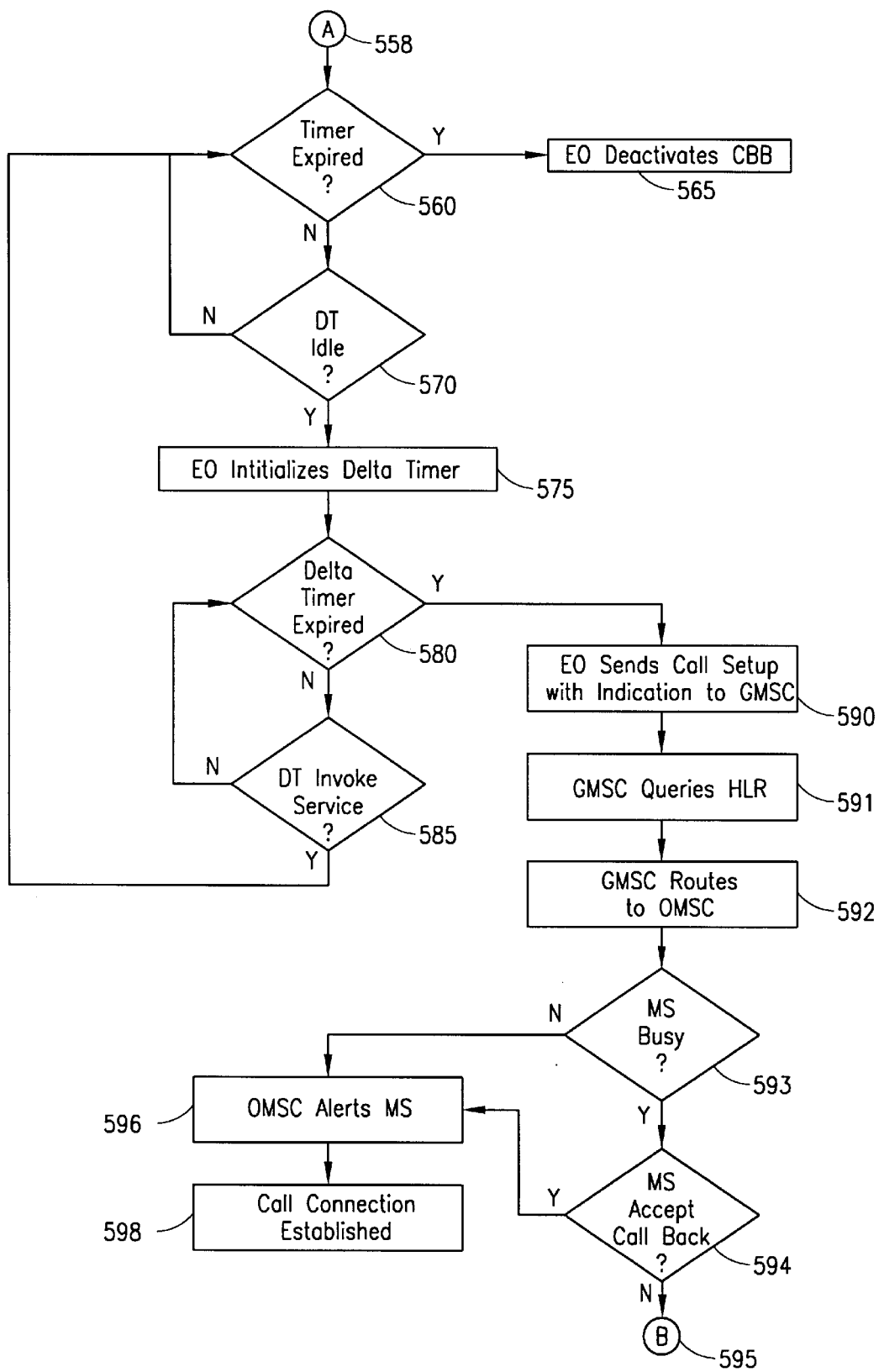

With reference now to FIGURE 5B (step 558), if the destination terminal 170 does not become idle before the expiration of the duration timer 90 (step 560), the end office 160 deactivates the call back on busy feature 40 (step 565). However, if, during the duration timer 90 period (step 560), the destination terminal 170 becomes idle (step 570), e.g., the end office 160 releases circuits previously assigned to the destination terminal 170, the end office 160 initiates the delta timer 95 (step 575) in order to allow the destination terminal 170 to access any necessary services, such as initiating an emergency call, etc.

If the destination terminal 170 invokes any service before the expiration of the delta timer 95 (steps 580 and 585), the end office 160 defers the call back until the destination terminal 170 once again becomes idle during the duration timer 90 period (steps 560 and 570). Otherwise, at the expiration of the delta timer 95 (step 580), the end office 160 sends a call setup message 100 including the indication 110 to the GMSC 150, using the calling subscriber information 72 stored in the database 80 (step 590). The GMSC 150 queries the HLR 26 associated with the previous calling MS 20 for a routing number for the calling MS 20 (step 591), and upon receipt of the routing information, routes the call setup message 100, including the indication 110, to the MSC/VLR 14 of the calling MS 20 (step 592). As discussed above, if the original MSC/VLR 14 has stored an indication of cancellation of the invocation of the call back on busy feature 40, the call back is canceled.

If the calling MS 20 is now busy (step 593), based on the indication 110 included in the call setup message 100, the MSC/VLR 14 can choose to disconnect the call or allow the calling MS 20 to choose whether or not to release any existing calls and accept the call back call (step 594). If the calling MS 20 is not busy (step 593) or chooses to accept the call back call (step 594), the MSC/VLR 14 marks that the call back is in progress and uses the indication 110 sent in the call setup message 100 to alert the calling MS 20 in a special manner so that the calling MS 20 is aware that the incoming call is due to the previously requested call back (step 596). Otherwise, the MSC/VLR 14 disconnects the call back call (step 595).

When the calling MS 20 "answers" the call, the MSC/VLR 14 informs the end office 160 via the GMSC 150 that the connection to the calling MS 20 has been established. Thereafter, the end office 160 rings the destination terminal 170 and establishes a call connection between the calling MS 20 and the destination terminal 170 (step 598).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for implementing a call back on busy feature within a cellular network, comprising:
   a calling mobile station within said cellular network having a call back on busy feature associated therewith, said mobile station sending a subscriber-defined time interval for attempting a call back of a called destination terminal;
   an originating mobile switching center in wireless communication with said calling mobile station for receiving a busy indication for said called destination terminal in response to a call setup attempt to said called destination terminal; requesting said subscriber-defined time interval from said calling mobile station in response to receiving said busy indication and monitoring said called destination terminal for being idle during said subscriber-defined time interval; and
   a timer within said cellular network, said timer being initialized with said subscriber-defined time interval upon receipt of said subscriber-defined time interval at said cellular network from said calling mobile station;
   wherein said call back of said called destination terminal is initiated upon detection of said called destination terminal becoming idle before the expiration of said timer.

2. The telecommunications system of claim 1, wherein said originating mobile switching center sends an announcement to said calling mobile station requesting said subscriber-defined time interval.

3. The telecommunications system of claim 2, wherein said originating mobile switching center sends an additional announcement to said calling mobile station requesting activation of said call back on busy feature, said announcement requesting said subscriber-defined time interval being sent in response to activation of said call back on busy feature by said calling mobile station.

4. The telecommunications system of claim 3, wherein said originating mobile switching center stores a subscriber property associated with said calling mobile station therein, said subscriber property identifying said calling mobile station as being capable of activating said call back on busy feature.

5. The telecommunications system of claim 1, wherein said originating mobile switching center sends a message including said subscriber-defined time interval to a switch serving said called destination terminal in response to receiving said subscriber-defined time interval.

6. The telecommunications system of claim 5, wherein said switch includes said timer.

7. The telecommunications system of claim 6, wherein said switch sends a call setup message for said call back to said called destination terminal to a serving mobile switching center serving said calling mobile station in response to said called destination terminal becoming idle before the expiration of said timer.

8. The telecommunications system of claim 7, wherein said call setup message includes an indication that said call back is in response to activation of said call back on busy feature.

9. The telecommunications system of claim 8, wherein said serving mobile switching center alerts said calling mobile station to said call back using said indication.

10. The telecommunications system of claim 9, wherein said serving mobile switching center uses a predetermined call back ringing tone to alert said calling mobile station.

11. The telecommunications system of claim 7, wherein said switch includes a delta timer having a predetermined time period associated therewith, said delta timer being initialized in response to said destination terminal becoming idle, said all setup message being sent upon the expiration of said delta timer.

12. The telecommunications system of claim 11, wherein said switch defers the sending of said call setup message in response to said destination terminal invoking a telecommunications service before the expiration of said delta timer.

13. The telecommunications system of claim 1, wherein said called destination terminal is a destination mobile station, said switch being a destination mobile switching center in wireless communication with said called destination mobile station.

14. The telecommunications system of claim 1, wherein said called destination terminal is a wireline destination terminal, said switch being an end office in communication with said wireline destination terminal.

15. A method for implementing a call back on busy feature within a cellular network, comprising the steps of:
   receiving a busy indication for a called destination terminal in response to a call setup attempt to said called destination terminal at an originating mobile switching center in wireless communication with a calling mobile station having a call back on busy feature associated therewith;
   requesting a subscriber-defined time interval for attempting a call back of said called destination terminal from said calling mobile station in response to receiving said busy indication;

sending said subscriber-defined time interval to a switch serving said called destination terminal to monitor said called destination terminal for being idle for the duration of said subscriber-defined time interval;

initializing a timer with said subscriber-defined time interval upon receipt of said subscriber-defined time interval at said switch;

monitoring, by said switch, said called destination terminal for being idle for the duration of said timer; and initiating said call back of said destination terminal upon detection of said called destination terminal becoming idle before the expiration of said timer.

16. The method of claim 15, wherein said step of requesting further comprises the step of:

sending an announcement from said originating mobile switching center to said calling mobile station requesting said subscriber-defined time interval.

17. The method of claim 16, further comprising the step of:

sending an additional announcement from said originating mobile switching center to said calling mobile station requesting activation of said call back on busy feature, said step of sending said announcement requesting said subscriber-defined time interval being performed in response to activation of said call back on busy feature by said calling mobile station.

18. The method of claim 15, wherein said step of initializing further comprises the step of:

initializing said timer within said switch with said received subscriber-defined time interval.

19. The method of claim 18, further comprising the step of:

sending a call setup message for said call back to said called destination terminal from said switch to a serving mobile switching center serving said calling mobile station.

20. The method of claim 19, wherein said step of sending said call setup message further comprises the step of:

sending an indication that said call back is in response to activation of said call back on busy feature within said call setup message.

21. The method of claim 20, further comprising the step of:

alerting said calling mobile station to said call back using said indication.

22. The method of claim 21, wherein said step of alerting further comprises the step of:

using a predetermined call back ringing tone to alert said calling mobile station.

23. The method of claim 19, wherein said step of sending said call setup message further comprises the step of:

initializing a delta timer having a predetermined time period associated therewith in response to said destination terminal becoming idle, said call setup message being sent upon the expiration of said delta timer.

24. The method of claim 23, wherein said step of sending said call setup message further comprises the step of:

deferring the sending of said call setup message in response to said destination terminal invoking a telecommunications service before the expiration of said delta timer.

25. The method of claim 15, wherein said step of sending said subscriber-defined time interval to said switch further comprises the step of:

sending a message including said subscriber-defined time interval to a destination mobile switching center in wireless communication with a destination mobile station.

26. The method of claim 15, said step of sending said subscriber-defined time interval to said switch further comprises the step of:

sending a message including said subscriber-defined time interval to an end office in communication with a wireline destination terminal.

* * * * *

UNITED STATES PATENT AND TRADEMARK OFFICE
CERTIFICATE OF CORRECTION

PATENT NO. : 6,456,842 B1
DATED : September 24, 2002
INVENTOR(S) : Kalpana Subramanian et al.

It is certified that error appears in the above-identified patent and that said Letters Patent is hereby corrected as shown below:

Column 3,
Line 25, replace "he MSC/VLR 14" with -- the MSC/VLR 14 --
Line 26, replace "2D or other" with -- 25 or other --

Column 4,
Line 14, replace "(step 315)" with -- (step 315). --
Line 59, replace "MS 20a warts" with -- MS 20a wants --

Column 5,
Line 26, replace "14bqueries" with -- 14b queries --
Line 47, replace "20athat" with -- 20a that --

Column 6,
Line 7, replace "SB of the drawings" with -- 5B of the drawings --
Line 60, replace "f the calling" with -- If the calling --
Line 55, replace "FIGURE SB" with -- FIGURE 5B --

Column 8,
Line 42, replace "said all setup" with -- said call setup --

Signed and Sealed this

Twenty-fifth Day of February, 2003

JAMES E. ROGAN
*Director of the United States Patent and Trademark Office*